United States Patent

Bordes

[15] 3,643,934
[45] Feb. 22, 1972

[54] RESILIENT SYSTEM WITH COMPENSATING DEVICE FOR VARIABLE FORCE EXERTED THEREBY

[72] Inventor: Cornelis Bordes, Bloemendaal, Netherlands

[73] Assignee: N.V. Industrieele Handelscombinatie Holland, Rotterdam, Netherlands

[22] Filed: Dec. 4, 1969

[21] Appl. No.: 882,210

[30] Foreign Application Priority Data

Dec. 4, 1968 Netherlands..........................6817380

[52] U.S. Cl............................................267/155, 269/157
[51] Int. Cl................................................F16f 15/02
[58] Field of Search.................267/150, 151, 125, 126, 135, 267/137, 166, 178, 157

[56] References Cited

UNITED STATES PATENTS

| 3,516,628 | 6/1970 | Kendall | 267/126 |
| 3,158,392 | 11/1964 | Shell | 267/178 |
| 1,338,673 | 5/1920 | Cauley | 267/178 |

Primary Examiner—James B. Marbert
Attorney—Young & Thompson

[57] ABSTRACT

A mechanical or fluid spring acts with a force that varies according to its extension. These force variations are compensated by a compression spring that acts in concert with the main spring between overcenter positions in which the compression spring acts with or against the main spring. Preferably, there is an opposed pair of compression springs whose forces act toward and balance each other in the overcenter position.

6 Claims, 5 Drawing Figures

INVENTOR
CORNELIS BORDES
BY Young & Thompson
ATTORNEYS

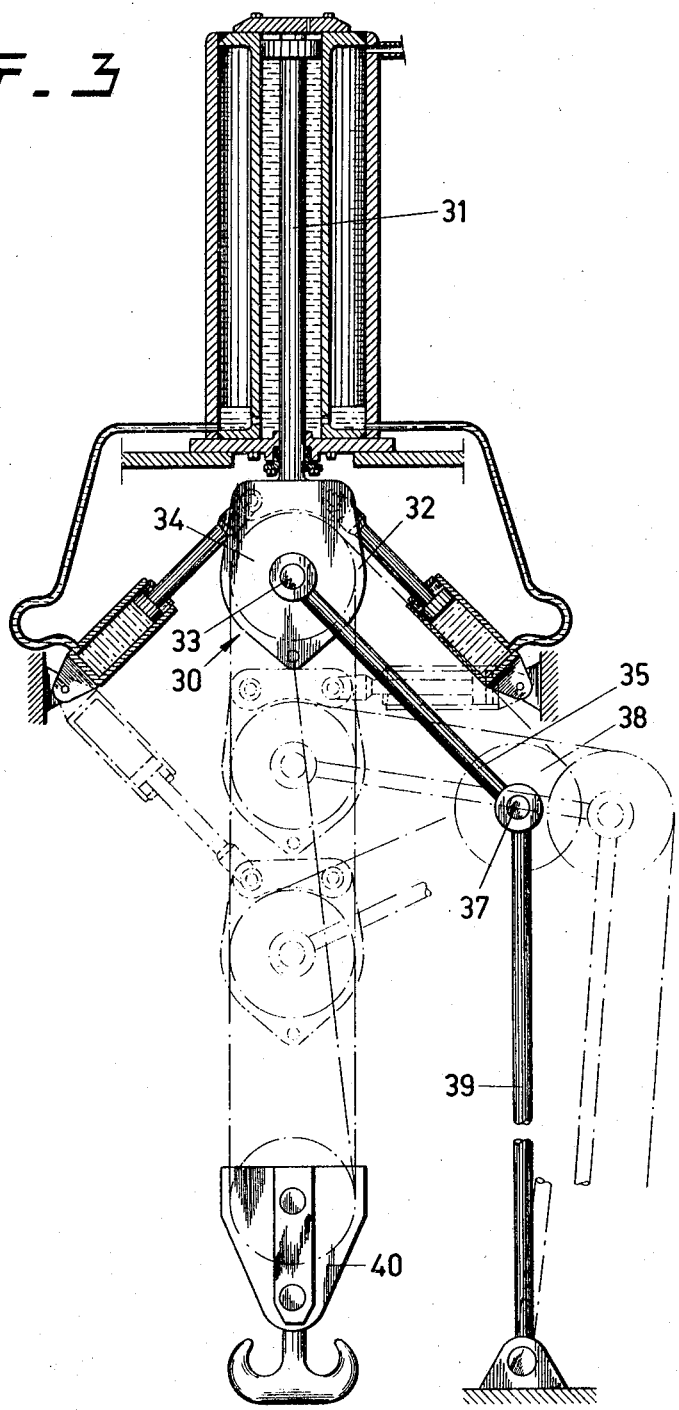

RESILIENT SYSTEM WITH COMPENSATING DEVICE FOR VARIABLE FORCE EXERTED THEREBY

The invention relates to a compensating device for a force exerted by a main spring element, which is anchored at one end and at its other end to an object on which the force is exerted, said force varying with the varying length of the main spring element.

As used in the following specification and claims, the term "spring" refers not only to mechanical springs but also to fluid springs such as hydraulic and/or pneumatic springs.

An object of the invention is to provide a solution for the adjustment of the force exerted on the object within narrow limits and over a relatively long distance.

An example hereof occurs in submarine operations from a vessel, such as dredging, diving, exploration of the sea bottom, exploring for oil and natural gas, installing underwater anchorage systems or pipelines, which are often hampered by the lack of an apparatus permitting continuation of the operations when the motions of the vessel due to the swell or the weather conditions exceed a relatively low value. Then there is a need of a resilient system having a relatively long spring travel, and of which the spring force has a characteristic which meets specific demands, for example, being substantially constant over a long distance. In several of these operations it would be desirable that the spring force is adapted to be adjusted, for instance, for the adjustment in a deep drilling operation according to the increasing depth, where a compensation is required for the greater length of drill rods, in order to maintain a substantially constant bit load or to furnish a bit load of a desired magnitude. The latter problem makes itself felt as well in deep drilling operations from a floating platform or from a platform supported by columns extending in the sea floor as in operations on land.

It is an object of the invention to furnish a resilient system which solves the above-mentioned problems. Other applications are in conveying of material at sea from one floating body to another floating body or platform.

According to the invention this is accomplished by providing at least one other spring element which acts at one end in compression on the object and is anchored at its other end, the direction of the force exerted by the other or auxiliary spring element being at an angle to the direction of the force exerted by the main spring element.

The characteristics of the resulting force may be determined by a proper selection of the properties of the individual spring elements.

When the length of the main spring element varies between its extreme values, the angle between the directions of the forces exerted by the main spring element and the auxiliary spring element preferably passes the perpendicular position, that is, passes over center. Because of this, components may be utilized which alternately cooperate with the principal force and oppose it.

The resilience of the spring elements may be adjustable. This may be effected for each spring element individually or collectively.

In the aforesaid applications considerable forces are generally exerted, and that is why the spring elements are preferably hydraulic cylinders, which are adapted to be connected to pressure accumulating means either individually or collectively. The resultant of the forces exerted by the resilient system, may be accurately determined for large deflections of the main spring element by a suitable choice of the dimensions of the pressure accumulator and the proportions of the piston area.

The invention will now be described in more detail while referring to the annexed drawings, wherein preferred embodiments of the invention are shown.

FIGS. 1a, 1b, and 1c are diagrams for the purpose of illustrating the functioning of the resilient system.

FIG. 3 shows the system applied in a derrick on a floating platform.

Figure 1A:
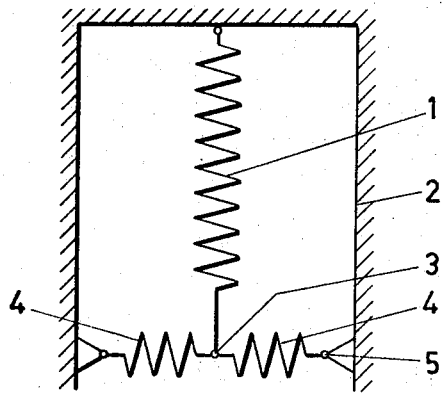
Figure 1B:
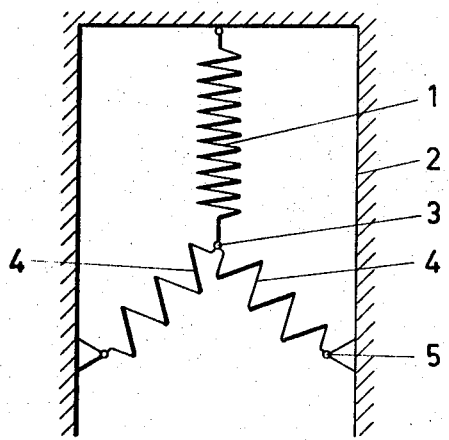
Figure 1C:
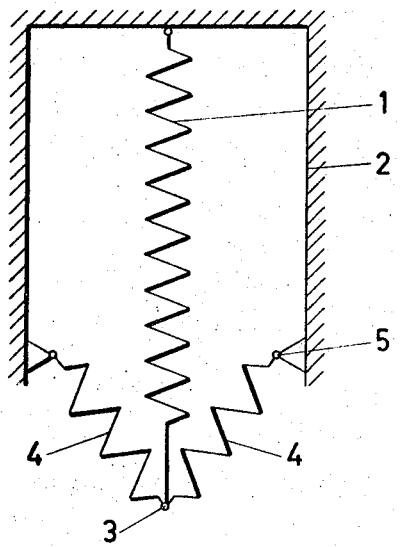

FIG. 1 shows, in principle, three phases of the resilient system. In these figures the main spring element 1 is attached at one end to the frame 2, and at its other end to a pivot joint 3. There are shown two auxiliary spring elements 4, each of which is attached at one end to the frame 2 by means of a pivot joint 5, and with its other end to the pivot joint 3. The force exerted by the resilient system extends in the longitudinal direction of the main spring element 1. The spring elements 4 are both in compression and act toward each other with equal force in their FIG. 1a position.

By a proper choice of the spring constants of the elements, that is, the change in the force exerted by the spring element in question divided by the corresponding change in its length, the change in force, which is required to move the main pivot joint 3, may be varied within wide limits. For many of the aforesaid applications the most important choice of the spring constants of the spring elements is that by which the required force for moving the main pivot joint 3 over its path becomes practically independent of the displacement of said hinged connection, so that the spring constant of the apparatus approaches zero.

In order to obtain the same result with only a single-spring element 1, this element would have to have an infinite length. The resilient system shown has therefore both practical and economical advantages.

With applications in which strong forces and considerable deflecting movements are involved, like the applications mentioned in the preamble, the use of a gas compressed in a pressure accumulator is a suitable means of storing the great quantities of energy involved. In this case the spring elements may be constructed as pneumatic, or hydraulic cylinders which are connected to one or more vessels either individually or collectively, in which vessels the energy, in the form of gas under pressure, is stored.

Figure 2:
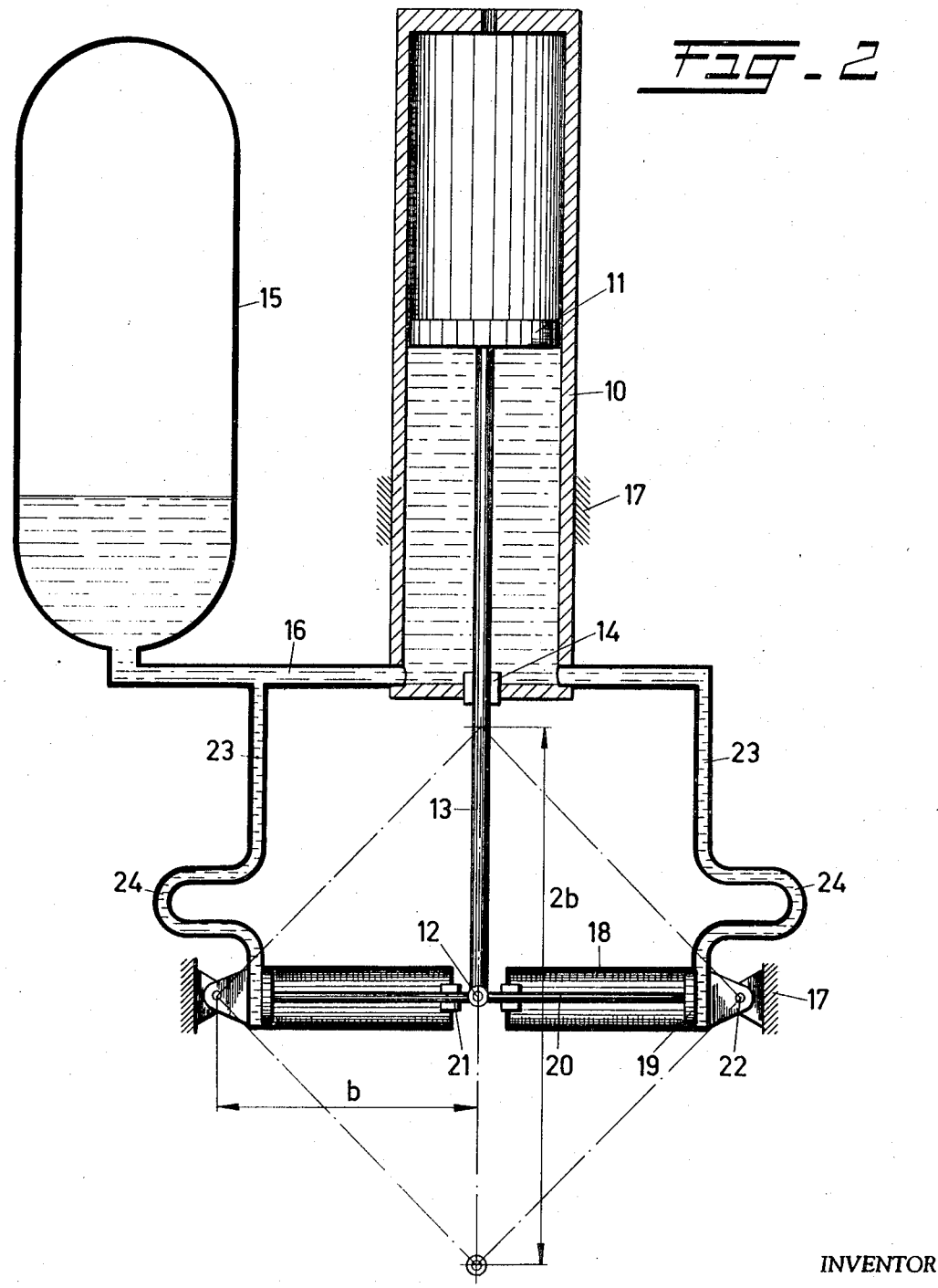
FIG. 2 shows an embodiment in which the spring elements are constructed as hydraulic cylinders.

FIG. 2 shows the arrangement of an installation, in which this means of storing energy is used. Here the main spring element comprises a main cylinder 10 in which a piston 11 is positioned, said piston 11 being connected with the main pivot joint 12 via a piston rod 13. The piston rod extends through the open end of the cylinder 10 having sealing means 14. The lower end of the cylinder is connected with a pressure accumulator 15 through a pipe 16, while the upper end of the cylinder is open to the atmosphere, or to a room having a lower pressure. The main cylinder 10 is rigidly attached to the frame 17. The two auxiliary spring elements shown in this embodiment comprise auxiliary cylinders 18 with pistons 19 which are connected via piston rods 20 to the main pivot joint 12, said piston rods extending through the top ends of the cylinders 18 via sealing sleeves 21. The attachment of the auxiliary cylinders 18 to frame member 17 is effected by means of the pivot connections 22. The space in each of the cylinders 18 at the side of the pivot connections 22 is connected through a pipe 23 and a flexible length of pipe 24 with the pressure accumulator 15, while the opposite end of each cylinder communicates with the atmosphere, or with a space with a lower pressure. In this system an upwardly directed force is exerted on the hinged connection 12. If it is desired that a force be exerted in the opposite direction, it is necessary only to reverse the connections of the low-pressure side and the high-pressure side of cylinder 10, with the atmosphere or the space of low pressure and the pressure accumulator respectively. The magnitude of the force exerted by the resilient system may be adjusted by varying the pressure (quantity of gas) in the pressure accumulator 15. Means for accomplishing this have not been shown in FIG. 2, but are generally known in the art.

By a suitable choice of the piston area of the spring elements and under isothermal conditions and neglecting any frictional forces, a regulation of the force exerted within less than ±1 percent may be obtained for a total displacement of the main pivot connections 12 of 2b, b being the shortest distance between each pivot 22 and the pivot connection 12, if an average volume of gas in the accumulator is used which does not exceed five times the volume of the main cylinder displaced during this movement. If a conventional single cylinder and pressure accumulator were used, a gas volume would be required of roughly 50 times the volume displaced by the main cylinder to obtain the same regulation. With smaller volumes of gas in the pressure accumulator, a very small spring constant may be obtained over a central part of the displacement with the resilient system shown, while the spring constant rapidly increases when the displacement exceeds these limits. This provides a valuable safety factor for the aforementioned applications, in case the relative motions exceed the values for which the apparatus has been designed.

FIG. 3 shows the invention applied in a deep drilling apparatus, installed on a floating platform, in order to isolate the drill string from the motion of the floating platform and to allow for changes in the bit load to be effected without interrupting the drilling operation, by providing a compensation for the vertical motion of the vessel near the crown block of the derrick. This resilient system may completely substitute for the conventional drilling method with the aid of a sliding mechanism provided in the string of drilling rods. In this embodiment, the pressure accumulator is constructed in the form of a pressure vessel surrounding the main spring element. The pivots for the connection of the individual auxiliary piston rods with the main piston rod are spaced apart. In addition to the members already described, an element is provided in this embodiment for restricting the movement of the hoisting cable over the sheaves in the pulley-block when the vessel moves relative to the drill rods in order to minimize the frictional effects, and to protect the rope from undue wear.

The main pivot is formed integrally with the main piston rod 31, the crown block 32 and the pivot pin 33, around which a number of sheaves 34 rotate, over which the hoisting cable is passed, said hoisting cable carrying a travelling block 40.

A rod 35 is pivotally attached, e.g., by the pin 33, to the crown block. At the opposite end of this rod 35 a pin 37 is provided, around which a sheave 38 rotates, said sheave guiding in its turn the outgoing part of the hoisting rope. This terminal end of the rod is pivotally supported by a second rod 39, this rod in its turn being pivotally attached to a relatively fixed part of the derrick.

A relative displacement in a vertical direction between the vessel and the drill rods is permitted in such installation while the tension in the drill rods may be controlled within narrow limits by means of the gas pressure in the pressure accumulator. Under conditions where the limits within which the control can be attained are considerably smaller than the bit loading to be used, the bit loading may be adjusted as well during the drilling operation. For applications in which the bit loading is very small compared with the weight of the string of drill rods, such as in core drilling operations, the apparatus may easily be converted easily be converted from a tension regulating device into a displacement regulating device. For this conversion an object is used, which has a greater weight than the limits of the force regulation of the resilient system, said object being placed on the sea floor, and connected through a rope with the crown block. In this case the required bit loading may be maintained in the conventional way by using a slidable extending system in the string of drill rods with or without additional weights.

It is understood that generally leverage systems may be provided between the spring elements and the main pivot joint. Other variations may be obvious to a person skilled in the art.

What is claimed is:

1. A resilient system comprising a main spring element anchored at one end and interconnected at its other end with an object on which said main spring element exerts force in one direction, said force varying with the varying length of the main spring element, an auxiliary spring element that is anchored at one end and that acts on said object in compression in a second direction at an angle to said one direction, and means mounting said auxiliary spring element for swinging movement such that said angle changes upon extension and retraction of said main spring element.

2. A system as claimed in claim 1, said mounting means comprising means mounting said auxiliary spring element for overcenter swinging movement such that said two directions pass the perpendicular position relative to each other.

3. A system as claimed in claim 2, there being two said auxiliary spring elements on opposite sides of the line of action of said main spring element, said auxiliary spring elements acting in compression toward each other with equal force in axial alignment with each other when in said overcenter position.

4. A system as claimed in claim 1, there being two said auxiliary spring elements on opposite sides of the line of action of said main spring element, said auxiliary spring elements acting in compression toward each other with equal force in axial alignment with each other when in an overcenter position.

5. A system as claimed in claim 1, said pring elements being hydraulic cylinders, and a pressure accumulator with which the hydraulic fluid of said hydraulic cylinders communicates.

6. A system as claimed in claim 5, the hydraulic fluid in all the cylinders being in intercommunication.

* * * * *